United States Patent Office 2,737,445
Patented Mar. 6, 1956

2,737,445

PROCESS FOR THE THERMAL DECOMPOSITION OF METAL NITRATES

Ernest Samuel Nossen, Paterson, N. J.

No Drawing. Application September 14, 1951,
Serial No. 246,723

12 Claims. (Cl. 23—158)

This application is a continuation-in-part application of the U. S. patent application Serial No. 92,079, filed on May 7, 1949, and which has issued as Patent No. 2,681,268, dated June 15, 1954, for "Process for the Manufacture of Manganese Dioxide and Depolarizers for Electric Cells," and of the U. S. patent application Serial No. 199,181, filed on December 5, 1950, for "Separation of Manganese from Iron and other Undesirable Ore Components."

This invention relates to metal nitrates and more particularly to the thermal decomposition of metal nitrates.

In the course of thermal decomposition of most of the metal nitrates into oxides or metals, $N_2O_4$ and/or $NO_2$, a heavy brown poisonous gas, is formed. A huge installation would be required to convert said $N_2O_4$ and/or $NO_2$ into nitric acid in order to recover the acid. Therefore, this method is not applied as a general procedure.

An object of the invention is to provide a process for the thermal decomposition of metal nitrates, by means of which the nitric acid may be readily recovered at negligible cost.

Other objects and details of the invention will be apparent from the following description.

Hereinafter the symbol "M" is used to broadly indicate a metal.

If $NMO_3$ (a metal nitrate) is heated above the temperature of decomposition in the presence of steam, the following reactions take place:

(1)   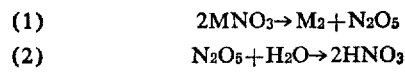2$MNO_3 \rightarrow M_2 + N_2O_5$ (2)   $N_2O_5 + H_2O \rightarrow 2HNO_3$ In said equations $N_2O_5$ represents nitric acid anhydride being unstable as such and having, like all of the anhydrides, the tendency to combine with water to form the true acid in an exothermic reaction. If no water is present, the nitric acid anhydride $N_2O_5$ is rapidly decomposed into $N_2O_4$ and O according to the reaction.

(3)   $N_2O_5 \rightarrow N_2O_4 + O$

Then, $N_2O_4$ is dissociated into $2NO_2$, the extent of dissociation depending on the temperature. However, this reaction can be slowed down by a high amount of oxygen present in the gas atmosphere bringing the equilibrium to the left side and protecting the $N_2O_5$, until it combines with water according to Reaction 2. A sufficient amount of water has to be present to form the nitric acid $HNO_3$ and to protect same against splitting. The nitric acid must be removed from the reaction zone as fast as possible so as to prevent Reaction 2 from going to the left side under the influence of too high a temperature. This feature may be obtained by subjecting the gaseous products to a sucking action or by adding a gas, preferably a gas containing oxygen, such as air, or by using an excess of steam. The nitric acid is recovered from the gaseous reaction products by condensation.

If the metal nitrates are decomposed in accordance with the invention in the manner described above, Reaction 3 does not take place and no brown fumes of $N_2O_4$ and/or $NO_2$ will be noticed in the decomposition unit.

Instead of using dry metal nitrates and introducing steam into the decomposition unit, it may be more convenient to use an aqueous metal nitrate solution and to effect the decomposition in such a way that always a sufficient quantity of water is present; this may be accomplished by introducing continuously fresh metal nitrate solution into the decomposition unit. Since, in such a case, the reaction takes place in a thin film of material, a complete decomposition may be obtained. Furthermore, the decomposition of a metal nitrate solution renders unnecessary the steps of concentrating and crystallizing the solid salt.

In the event that a metal is capable of forming two different oxides, for example nickel which may form $NiO$ or $Ni_2O_3$, the higher oxides will be formed if the decomposition of the metal nitrates solution takes place in the presence of a gas containing oxygen. If it is desired to produce the lower oxides, an inert gas, such as nitrogen or steam, is used alone, instead of a gas containing oxygen.

If a nitrate of a noble metal is decomposed, a metal is formed by the decomposition process as one of the decomposition products.

The decomposition process according to the invention may be applied to all metal nitrates which in their anhydrous state develop nitrogen dioxide ($NO_2$ and/or $N_2O_4$) when heated.

The decomposition temperature depends on the nitrate to be treated. The decomposition temperature may be as low as 60° C., for example for the decomposition of ferrous nitrate, or as high as 600° C., for example for the decomposition of calcium nitrate. However, the nitrates of the most important metals decompose at a temperature between 120° C. and 250° C.

The method of decomposition according to the invention may be used to form oxides of the following metals: Al, Be, Bi, Cd, Ce, Cr, Co, Cu, Ga, Hg, In, Fe, Pb, Mn, Ni, Sn, Te, U, Zn, and to form the metals themselves such as: Ag, Au, Pt.

The metal nitrates to be decomposed in accordance with the decomposition process of the invention may be obtained in any suitable manner, for example by dissolving a metal oxide or a metal in nitric acid. The decomposition process according to the invention renders possible recovery of the nitric acid used in the preparation of the nitrate solution.

Preferably, the formation of the metal oxide from its nitrate solution and the recovery of the nitric acid are carried out in a single unit of equipment. In a preferred embodiment, such a unit comprises a housing enclosing an internally heated rotatable drum on which the reaction takes place, a feed tank, for a supply of metal nitrate solution, connected with said drum, a knife arranged for taking off the oxide formed on the drum, a first aperture on said housing connected with a pipe for leading the gases containing nitric acid vapors to a condenser and a container for collecting the nitric acid in its liquid form, and a second aperture on said housing for the discharge of the solid material obtained by the decomposition; said second aperture may also be used as an inlet for steam and/or gas and/or air. The drum is heated to a temperature at least as high or higher than the decomposition temperature of the metal nitrate to be decomposed.

If desired, a decomposition equipment of different construction may be used for the performance of the method according to the invention, provided, of course, that the equipment permits the application of the above mentioned principles.

The thermal decomposition of metal nitrates according to the invention may be used as a production step in many instances. For example, it may be used: in the recovery of metals from ore sometimes combined with a selective reduction and leaching of the ore in nitric acid, or in the production of metal oxides for pigment purposes, such as for the production of ZnO, Al₂O₃ and Cr₂O₃, or in the production of catalysts, for example Ni on an alumina support, by decomposing a nickel nitrate solution containing the alumina in suspension or by decomposing a solution of nickel and aluminum nitrate, or in the production of metal powders by reducing the formed pure metal oxides in a reducing atmosphere to powder metal, or in the formation of basic nitrates, also called subnitrates or oxynitrates by decomposing a suitable metal nitrate solution at a lower temperature, making free only part of the nitric acid combined with the metal.

The process according to the invention will now be described by several examples, but it should be understood that these examples are given by way of illustration rather than by way of limitation, and that many variations may be made without departing in any way from the spirit of the invention.

I (a) 10 liters of an aluminum nitrate solution containing 213 grams of Al(NO₃)₃ per liter are fed continuously to a decomposition equipment as described above. The drum of the equipment is heated to a temperature of 190° C. Simultaneously herewith air is sucked through the system of the equipment for the removal of the gases out of the hot reaction zone. Said gases containing nitric acid vapors are cooled down to about room temperatures in the condenser connected with the decomposition equipment. The nitric acid liquified in the condenser is collected in a container. The gases are freed from small amounts of nitric acid vapors, which may be carried away with the air, by washing same in a second container filled with water. The aluminum oxide taken off from the drum of the equipment by the knife and ground is a very white fine powder.

After the test, the content of nitric acid in both containers has been determined by titration as 1796 grams. Since 1890 grams of nitric acid may be liberated theoretically from 2130 grams of Al(NO₃)₃, the percentage of the recovery of nitric acid amounts to 95%.

In the same equipment and according to the same method the following metal nitrate solutions have been decomposed:

(b) A ferric nitrate solution at a temperature of 125–135° C., (c) A zinc nitrate solution at a temperature of 220–225° C., (d) A cobalt nitrate solution at a temperature of 170–185° C., (e) A nickel nitrate solution at a temperature of 230–250° C., (f) A chromium nitrate solution at a temperature of 175–200° C., (g) A manganese nitrate solution at a temperature of 190–210° C., (h) A bismuth nitrate solution containing 20% free nitric acid at a temperature of 120–130° C.; in this case, owing to the decomposition at a comparatively low temperature, only part of the nitric acid combined with the bismuth is liberated, so that the bismuth nitrate solution is decomposed into the oxynitrate $BiONO_3 \cdot H_2O$ and gases containing nitric acid vapors.

In the decompositions according to (b)–(h) the recovery of the nitric acid amounts to 95–99%.

II (a) Lead nitrate is decomposed in a decomposition equipment comprising an externally heated tube with a temperature control, an attached condenser, a first container and a second container connected with the condenser and with each other, said first container being empty, said second container being filled with water and Raschig rings.

3.3 grams of $Pb(NO_3)_2$ are brought into the tube which is heated at a temperature of 370–400° C. Simultaneously herewith steam is blown over the lead nitrate. The steam passing through the equipment is condensed together with the nitric acid vapors developed during the decomposition. The white lead nitrate crystals turn into yellow lead oxide, while the nitric acid is formed and carried out of the reaction zone by the steam. It has been determined by tests that the nitric acid collected in both containers as a result of the decomposition described above amounts to 1.24 grams of HNO₃ and that, consequently, the recovery of the nitric acid amounts to 98.5%.

In the same equipment and according to the same method as described in the preceding paragraphs of Example IIa, the following metal nitrates have been decomposed:

(b) Mercuric nitrate was decomposed into red mercuric oxide (HgO) and nitric acid at a temperature of about 400° C.; nitric acid recovery was 99%.

(c) Cadmium nitrate was decomposed into brown cadmium oxide (CdO) and nitric acid at a temperature between 350 and 380° C.; nitric acid recovery was 94%.

The thermal decomposition of metal nitrates according to the present invention has great advantage over the hitherto customary method of production of metal oxides, which is rather complicated and expensive. According to the hitherto known method a solution of a metal salt is treated with an equivalent quantity of an alkaline hydroxide, whereby the hydroxide of the metal is precipitated. The filtration of this, in most cases gelatinous, precipitate and the washing thereof for removing the formed alkaline salt are difficult and time consuming steps causing a serious draw back at production scale. The acid combined with the metal in the salt and the added alkaline are a complete loss. In the process according to the present invention, however, the acid is quantitatively recovered and no alkaline is needed. The material leaving the decomposition unit may be used as such if the nitrate solution was purified prior to the decomposition process, otherwise it is washed and filtered very easily. The metal oxides produced in this manner under development of gases have a low bulk density and may be compared with oxides obtained by heating the hydroxides made in the usual manner.

I have described preferred embodiments of my invention, but it is understood that various changes may be made without departing from the spirit and scope of the invention as set forth in the appended claims.

I claim:

1. A process for the thermal decomposition of a metal nitrate of which the metal is selected from the electromotive series starting with magnesium towards and including the noble metals and which forms the unstable N₂O₅ as primary gaseous product when decomposed, into a solid product and nitric acid comprising the steps of: subjecting the metal nitrate to a temperature higher than the temperature of its decomposition in the presence of a continuous flow of steam, liberating unstable N₂O₅ and causing its reaction with said steam before it breaks down into lower nitric oxides, to form nitric acid vapors and a solid product and condensing said nitric acid vapors for recovery of the nitric acid in its liquid form.

2. A process for the thermal decomposition of a metal nitrate of which the metal is selected from the electromotive series starting with magnesium towards and including the noble metals and which forms the unstable N₂O₅ as primary gaseous product when decomposed, into a solid product and nitric acid comprising the steps of: subjecting the metal nitrate to a temperature higher than the temperature of its decomposition in the presence of a continuous flow of steam and an added gas, liberating unstable N₂O₅ and causing its reaction with said steam before it breaks down into lower nitric oxides, to form nitric acid vapors and a solid product and condensing said nitric acid vapors for recovery of the nitric acid in its liquid form.

3. In a process as claimed in claim 2 wherein the added gas is an inert gas.

4. In a process as claimed in claim 2 wherein the added gas is a gas inert to nitric acid under the conditions of operation.

5. In a process as claimed in claim 2, wherein said added gas contains oxygen.

6. A process for the thermal decomposition of an aqueous metal nitrate solution, containing a metal nitrate of which the metal is selected from the electromotive series starting with magnesium towards and including the noble metals and which forms the unstable $N_2O_5$ as primary gaseous product when decomposed, into a solid product and nitric acid comprising the steps of: subjecting the metal nitrate solution to a temperature higher than the decomposition temperature of said metal nitrate, liberating unstable $N_2O_5$ and steam and causing a reaction between said $N_2O_5$ and said steam before said $N_2O_5$ breaks down into lower nitric oxides to form nitric acid vapors and a solid product and condensing said nitric acid vapors for the recovery of the nitric acid in its liquid form.

7. In a process as claimed in claim 6 wherein said aqueous solution of the metal nitrate is subjected to said temperature in form of a thin film.

8. A process for the thermal decomposition of an aqueous metal nitrate solution, containing a metal nitrate of which the metal is selected from the electromotive series starting with magenesium towards and including the noble metals and which forms the unstable $N_2O_5$ as primary gaseous product when decomposed, into a solid product and nitric acid comprising the steps of: subjecting the metal nitrate solution to a temperature higher than the decomposition temperature of said metal nitrate in the presence of an added gas, liberating unstable $N_2O_5$, and steam and causing a reaction between said $N_2O_5$ and said steam before said $N_2O_5$ breaks down into lower nitric oxides to form nitric acid vapors and a solid product and condensing said nitric acid vapors for the recovery of the nitric acid in its liquid form.

9. In a process as claimed in claim 8 wherein said aqueous solution of the metal nitrate is subjected to said temperature in form of a thin film.

10. In a process as claimed in claim 8 wherein the added gas is an inert gas.

11. In a process as claimed in claim 8 wherein the added gas is a gas inert to nitric acid under the conditions of operation.

12. In a process as claimed in claim 8, wherein said added gas contains oxygen.

References Cited in the file of this patent

UNITED STATES PATENTS

| 982,466 | Blackmore | Jan. 24, 1911 |
|---|---|---|
| 1,552,117 | Cuno | Sept. 1, 1925 |
| 1,761,133 | Laury | June 3, 1930 |
| 2,127,504 | Derr et al. | Aug. 23, 1938 |

FOREIGN PATENTS

| 538,201 | France | Mar. 15, 1922 |
|---|---|---|
| 243,840 | Germany | Feb. 24, 1912 |
| 188,865 | Great Britain | Nov. 23, 1922 |
| 191,844 | Switzerland | Sept. 16, 1937 |

OTHER REFERENCES

Ephraim: "Inorganic Chemistry," page 697 (1943), Nodeman Pub. Co., N. Y. C.

Jacobson: "Encyclopedia of Chemical Reactions," Vol. I, pages 638, 639 (1946), Reinhold Publishing Corp., N. Y. C.

Mellor: "Comprehensive Treatise on Inorganic and Theoretical Chemistry," vol. 14, page 377 (1935), Longmans, Green and Co., N. Y. C.

UNITED STATES PATENT OFFICE
CERTIFICATE OF CORRECTION

Patent No. 2,737,445                 March 6, 1956

Ernest Samuel Nossen

It is hereby certified that error appears in the above numbered patent requiring correction and that the said Letters Patent should read as corrected below.

Column 1, line 40, for "$NMO_3$" read -- $MNO_3$ --; line 43, after the arrow, for "$M_2$" read -- $M_2O$ --.

Signed and sealed this 11th day of February 1964.

(SEAL)
Attest:

ERNEST W. SWIDER              EDWIN L. REYNOLDS
Attesting Officer             Acting Commissioner of Patents